United States Patent [19]
Davis

[11] 3,934,220
[45] Jan. 20, 1976

[54] METHOD OF SEISMIC EXPLORATION FOR PENETRATING DIFFRACTION BARRIERS AND/OR SURVEYING BENEATH OBSTACLES

[75] Inventor: JLee Davis, Ector, Tex.

[73] Assignee: Avance Oil & Gas Company, Inc., Midland, Tex.

[22] Filed: Jan. 22, 1975

[21] Appl. No.: 542,941

Related U.S. Application Data

[63] Continuation of Ser. No. 376,219, July 3, 1973, abandoned, which is a continuation-in-part of Ser. No. 145,811, May 21, 1971, Pat. No. 3,746,122.

[52] U.S. Cl. ... 340/15.5 MC; 340/15.5 CP; 340/7 R
[51] Int. Cl.² ............................................. G01V 1/20
[58] Field of Search ........... 340/15.5 CP, 15.5 MC, 340/15.5 TC, 340/7 R

[56] References Cited
UNITED STATES PATENTS

| | | | |
|---|---|---|---|
| 3,327,287 | 6/1967 | Ball et al. | 340/15.5 MC |
| 3,506,955 | 4/1970 | Backus et al. | 340/7 R |
| 3,731,270 | 5/1973 | Penhollow | 340/15.5 CP |

OTHER PUBLICATIONS
Richards, "Broadside Refraction Shooting," 10/59, pp. 725–748, Grophysics, Vol. 24, No. 4.

*Primary Examiner*—Maynard R. Wilbur
*Assistant Examiner*—N. Moskowitz
*Attorney, Agent, or Firm*—Giles C. Clegg, Jr.

[57] ABSTRACT

A number of seismic detectors are located in a two-dimensional array on the surface of the earth, either on land or at sea. One or more seismic disturbances are produced in the vicinity of the seismic detectors at points located to produce sampling of various subsurface reflection points to form one or more two-dimensional areas of coverage. For each seismic disturbance, the subsurface reflections thereof received by the various seismic detectors are recorded. In some embodiments, the seismic disturbances are produced at points located to produce multi-directional or multi-azimuth sampling of each of various subsurface reflection points and recordings for different ones of the seismic disturbances are combined to produce stacked recordings wherein multi-directional reflections from common subsurface points are added. By sampling a reflecting point in a multi-directional manner and stacking the recorded samples, diffraction barriers can be effectively penetrated to produce a discernable signal representing the reflecting point notwithstanding the diffraction barrier. Multi-directional or multi-azimuth sampling of reflecting points can be employed to survey beneath surface features such as inhabited areas or seismically opaque features such as salt pockets by utilizing source points and detecting points located away from and on opposite sides of the blocking feature.

2 Claims, 5 Drawing Figures

METHOD OF SEISMIC EXPLORATION FOR PENETRATING DIFFRACTION BARRIERS AND/OR SURVEYING BENEATH OBSTACLES

This application is a continuation of my copending U.S. Pat. application Ser. No. 376,219, filed July 3, 1973, now abandoned, entitled Method of Seismic Exploration For Penetrating Diffraction Barriers and/or Surveying Beneath Obstacles, which is in turn continuation-in-part of my U.S. Pat. No. 3,746,122, application Ser. No. 145,811 filed May 21, 1971, entitled Multi-directional Seismic Exploration Methods, and assigned to the same assignee as this application.

BACKGROUND OF THE INVENTION

This invention relates to seismic exploration methods for determining the location and course of subsurface earth structures.

A common method of seismic exploration is carried out by locating a string of spaced seismic detectors along a straight line at the surface of the earth. A seismic source is located in line with the detectors and operated to produce a seismic disturbance. Such disturbance produces subsurface reflections which are received by the detectors and recorded for later analysis. The string of detectors is then picked up and relocated either along a second line running parallel to the first line or at a new location in line with the first line and the foregoing process repeated for the second location. This process is continued until the desired area has been surveyed. As is apparent, this process can become rather tedious and time consuming where a relatively large surface area of the earth is to be surveyed.

A known problem which exists in the seismic exploration art is that of distinguishing the desired subsurface earth structure reflection signals from various extraneous seismic vibrations which are also received by the detectors and which are commonly referred to as "noise". A known technique for minimizing such noise is commonly referred to as "stacking". Such stacking technique involves the use of multiple sources for obtaining multiple reflections from a common subsurface point. After appropriate processing, the individual recordings for the common subsurface point are combined to produce a composite record wherein the desired signal components are emphasized and the undesired noise components are minimized. This stacking technique is described in greater detail in U.S. Pat. No. 2,732,906, granted to W. H. Mayne on Jan. 31, 1956 and in U.S. Pat. No. 3,040,833, granted to H. L. Mendenhall and S. D. Elliott on June 26, 1962.

It is an object of the present invention to provide new and improved methods of seismic exploration for obtaining a greater amount of data concerning subsurface earth structures for a given expenditure of time and labor or conversely, for obtaining a given amount of data for a lesser expenditure of time and labor.

It is another object of the invention to provide new and improved seismic exploration methods for enabling a greater degree of stacking for a given expenditure of time and labor.

It is a further object of the invention to provide new and improved seismic exploration methods for obtaining better data concerning subsurface earth structures.

Another object of the invention is to provide seismic exploration methods capable of penetrating seismic diffraction barriers created by objects in, in the neighborhood of, or above a geologic region of interest.

Yet another object of the invention is to provide methods for seismically exploring a geologic region of interest so located with respect to a surface feature, such as an inhabited area, or a subsurface feature, such as a salt pocket above the region, that substantially no meaningful seismic data can be obtained by running a survey line across the feature and the geologic region of interest.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE ILLUSTRATED EMBODIMENTS

Figure 1:
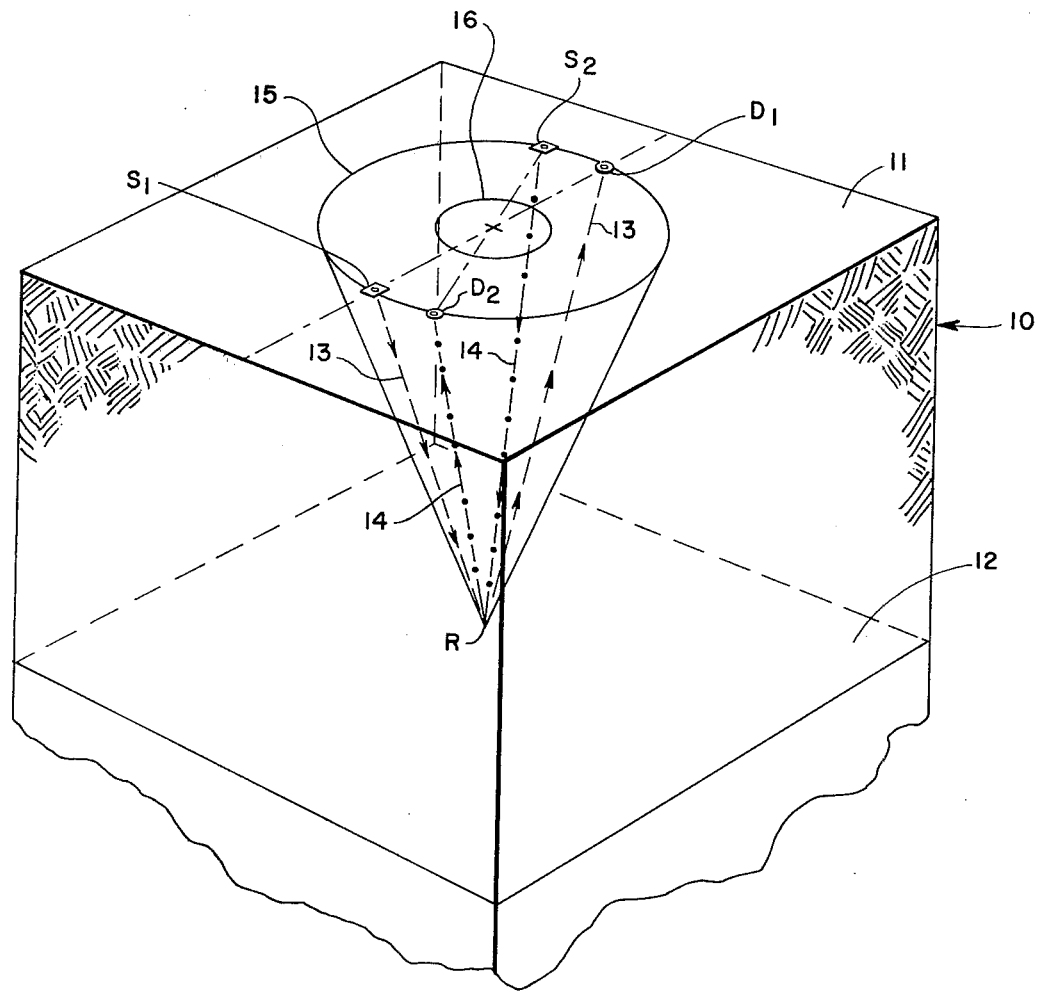
FIG. 1 is a perspective view of a volume of the earth and showing in a simplified manner one of the basic concepts of the present invention.

FIG. 1 shows a three-dimensional volume of earth structure 10, the surface of the earth being indicated at 11 and the upper surface of a subsurface earth strata being indicated at 12. In accordance with one embodiment of the invention, seismic sources $S_1$, $S_2$, etc., and seismic detectors $D_1$, $D_2$, etc., are located in a two-dimensional array at the earth's surface 11 for obtaining a multi-directional sampling of each of various subsurface reflection points, one of such points being indicated at R in FIG. 1. Reflection point R is located on the subsurface boundary plane 12. Seismic sources $S_1$, $S_2$, etc., are fired in a sequential manner to produce a time spaced series of seismic disturbances. For the subsurface point R, the seismic disturbance produced by source $S_1$ produces a seismic energy ray path 13 such that the reflection from the point R is received by the seismic detector $D_1$. Similarly, a portion of the energy produced by the seismic disturbance produced by source $S_2$ follows ray path 14 and is received by seismic detector $D_2$. The seismic disturbances received by each of the various detectors $D_1$, $D_2$, etc., are recorded by the usual type of signal recording apparatus (not shown), such apparatus being connected to the various detectors by means of appropriate signal conducting cables (not shown).

For each of the source-detector pairs shown in the idealized case of FIG. 1, the angle of incidence of the ray path is equal to the angle of reflection and the subsurface point R is located midway between the particular source and detector being considered. Additional source-detector pairs may be located on the circle 15 to produce additional samplings of the subsurface reflection point R along additional lines running in various additional compass directions or azimuths. Similarly, further source-detector pairs can be located on opposite sides of additional circles, such as the circle 16, which are concentric with the circle 15. In this manner, there can be developed a solid cone of data regarding the subsurface reflection point R. One practical consequence of this is that during the subsequent analysis the various pieces of data can be examined and only those pieces which give the best results can be selected and used to provide the final analysis. Also, as will be seen shortly, the basic concept of FIG. 1 can be readily extended to obtain multi-directional sampling of a relatively large number of subsurface reflection points during one and the same operation.

Figure 2:
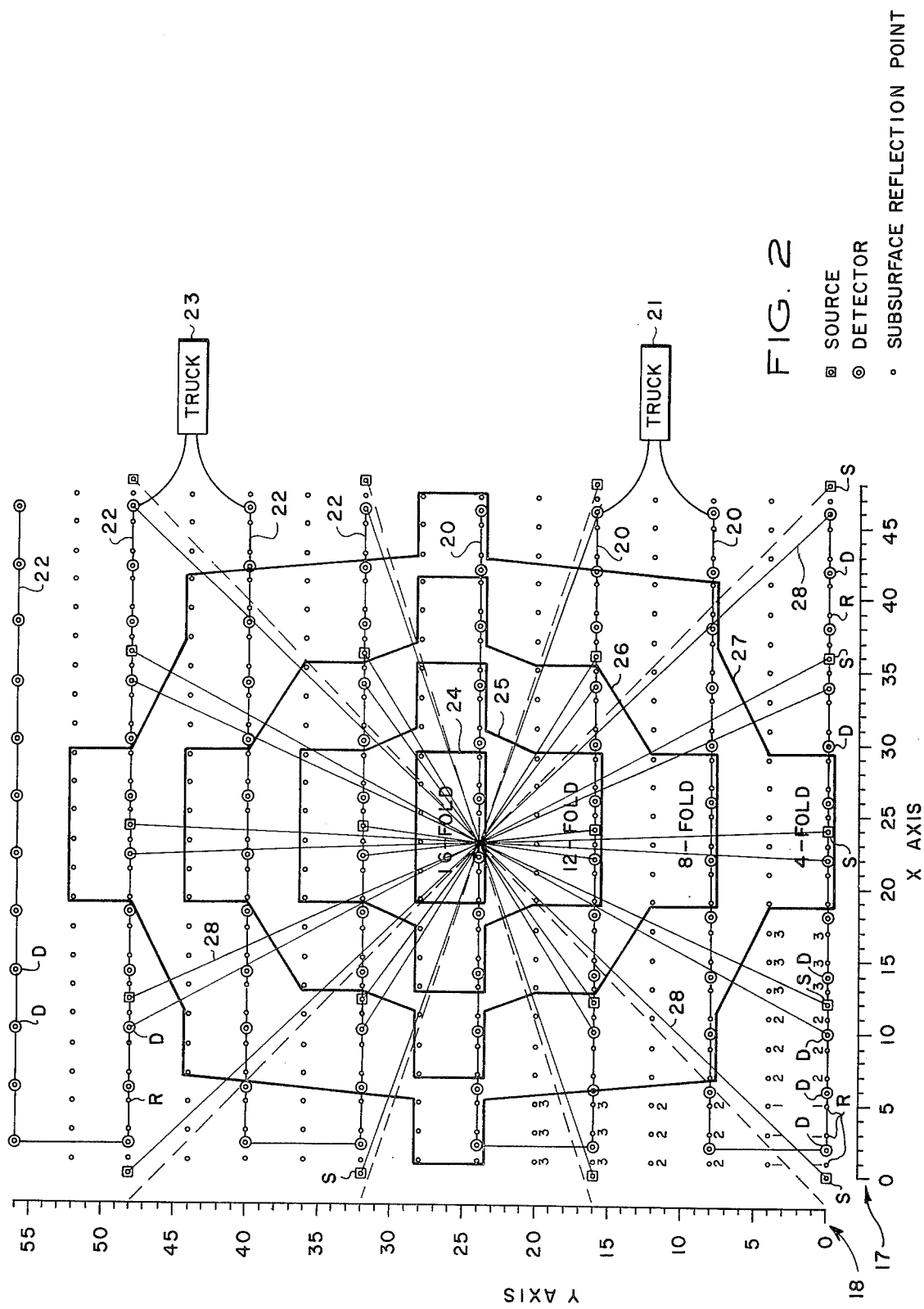
FIG. 2 is a plan view showing a two-dimensional layout of seismic cources and detectors on the surface of the earth in accordance with an areal embodiment of the invention.

Referring to FIG. 2, there is shown a plan view of a selected area on the surface of the earth. For accuracy of explanation, an imaginary X and Y coordinate system has been superimposed on the plan view of FIG. 2, the X axis scale of units being indicated at 17 and the Y axis scale of units being indicated at 18. For sake of example only, each distance unit on the X and Y scales may correspond to a physical distance of 110 feet, in which case the overall seismic array shown in FIG. 2 would cover an area of better than one square mile.

The seismic exploration system of FIG. 2 is an example of the manner in which the multi-directional sampling technique of FIG. 1 can be applied to a relatively large number of subsurface reflection points for purposes of providing a two-dimensional coverage of a relatively large area.

The seismic array of FIG. 2 includes a relatively large number of seismic sources S and a relatively large number of seismic detectors D located in a two-dimensional array covering a substantial surface area of the earth. Each of the sources S is represented by a small square with a dot in the center thereof, while each of the detectors D is represented by a small circle with a dot in the center thereof. The various subsurface reflection points R which are sampled are represented by small dots. As thus seen, the FIG. 2 array includes four parallel lines along which are disposed both sources S and detectors D, these lines being located at $Y = 0$, $Y = 16$, $Y = 32$, and $Y = 48$ and extending parallel to the X axis. The FIG. 2 array also includes four additional lines along which only detectors D are disposed, these lines being located at $Y = 8$, $Y = 24$, $Y = 40$ and $Y = 56$ and extending parallel to the X axis.

In addition to being parallel, the various source-detector and detector only lines are spaced a substantial distance apart. As used in this specification and the appended claims, the term "substantial distance" denotes a distance of 100 feet or more. Preferably, the spacing between detector lines in greater than the spacing between neighboring detectors on the same line. In the illustrated embodiment, neighboring detectors on the same line are spaced four units apart, while adjacent detector lines are spaced 8 units apart. Neighboring sources S on the same line are spaced 12 units apart and are located at points which are different from the detector D locations.

The seismic sources S may be of the impulse type or of the vibratory type. The seismic detectors D may take the form of various ones of the different types of seismometers and geophones which are known in the seismic art. Also, it is to be understood that each detector D, while spoken of in the singular, may, in fact, comprise a number of detectors grouped together in a cluster surrounding the common detector point for purposes of discriminating against undesired horizontally propogated seismic energy, this technique being known in the seismic art.

The detectors D in the lower four lines are connected to multi-conductor cables 20 which are, in turn, connected to appropriate signal recording apparatus in a recording truck 21. Similarly, the detectors D in the upper four lines are connected to multi-conductor cables 22 which are, in turn, connected to signal recording apparatus in a second recording truck 23. In both cases, the recording apparatus is preferably of the magnetic tape recording type.

Each of the 20 seismic sources S in FIG. 2 is caused to produce a seismic disturbance at a time which is different from the times at which the other sources S produce their disturbances. For each seismic disturbance, the resulting subsurface reflection signals which are produced by the 96 seismic detectors D are individually recorded on separate tracks on magnetic tape in the trucks 21 and 23. These field tapes are subsequently played back or reproduced in a coordinated manner for providing improved indications of the subsurface geology. This can be done in several different ways to accomplish several different purposes.

A particularly important purpose which can be accomplished with the FIG. 2 array is the "stacking" of reflections from common subsurface points for purposes of producing seismic records wherein the effect of seismic noise is minimized. The manner of combining the individual recordings or traces obtained for a given subsurface reflection point is pretty much the same as that employed in connection with the known stacking technique. Briefly, the individual field recordings for the given point are played back and processed in such a manner as to apply the customary elevation, weathering and normal moveout corrections thereto, the corrected traces being individually recorded on a second magnetic tape. The second tape is then played back and the individual corrected signals are combined to produce a single composite signal which is then recorded to provide a composite record wherein the reflections from the common subsurface point augment one another. At the same time, the undesired noise vibrations, which are of a more or less random character for the different directions, more or less cancel one another so as to minimize the net noise component in the final composite record. One form of magnetic recording apparatus suitable in a general sense for accomplishing this stacking process is described in the above-mentioned U.S. Pat. No. 3,040,833 to Mendenhall and Elliott, it being understood that a greater number of initial or input magnetic tape tracks and a somewhat different arrangement of switches would be required in the present case.

In the foregoing manner, thre can be provided stacked composite traces for 312 of the 336 reflection points shown in FIG. 2, there being six points in each corner of the array for which only a single reflection is recorded. Assuming that maximum stacking is desired, the composite traces for the reflection points R located within the area bounded by imaginary boundary line 24 are obtained by combining 16 separate reflections or folds. Similarly, the composite traces for the reflection points R located within the area between imaginary boundary lines 24 and 25 are obtained by combining 12 individual reflections or folds. The composite traces for the reflection points R in the area between imaginary boundary lines 25 and 26 are obtained by combining 8 different reflections or folds. The composite traces for the reflection points R in the area between imaginary boundary lines 26 and 27 are obtained by combining 4 different reflections or folds. For the remainder of the reflection points R lying outside the imaginary boundary line 27, the number of reflections which are combined are indicated by the small numerals adjacent such points as shown for the case of the reflection points in the lower left-hand corner of the FIG. 2 array.

Considering for example the reflection point R located at X–Y coordinate point (23, 24), there are 16 different source-detector pairs whose azimuths intersect on the surface of the earth above this point, and which produce and receive reflections from this point. The ray paths for these reflections are indicated by radial lines 28 passing through the point (23, 24). For this point there is obtained one recorded reflection for each of the sources S except for the four right-hand sources located at coordinate points (48, 0), (48, 16), (48, 32) and (48,48). Where maximum stacking is desired, the 16 individual reflection traces for the point (23, 24) are individually corrected for elevation, weathering and normal moveout and the resulting corrected traces are added together to produce the single composite trace for the point (23, 24).

Another important purpose which can be accomplished with an areal seismic array of the type shown in FIG. 2 is that it enables particular ones of the ray paths to be selected and displayed in a coordinated manner to provide improved indications of the subsurface geology. For example, where a fault crosses he asrea being surveyed, the ray paths which are interrupted by the fault provide poor data concerning the subsurface geology. On the other hand, the ray paths which run more or less parallel to the fault line and are not interrupted by same provide much better data concerning the subsurface geology. Thus, improved analysis can be obtained by selecting the latter type ray paths and reproducing same in a coordinated manner. The multi-directional aspect of the present embodiment makes possible such a selection of only the better data. This is accomplished by initially reproducing the various recorded reflections and studying same to obtain an approximate understanding of the peculiarities of the subsurface geology. Based upon this preliminary study, selected ones of the recorded reflections are thereafter reproduced in a coordinated manner for enabling an improved analysis of the subsurface earth structure.

In addition to selecting particular ray paths to eliminate poor data because of faults, particular ray paths can also be selected for other purposes. For example, particular ray paths may be selected to produce stacked records wherein the effect of changes in normal movement is reduced. Also, particular ray paths may be selected having lengths of the appropriate values for minimizing undesired noise effects. Also, as a general proposition, the recorded reflections which are to be coordinated can be chosen to concentrate or focus maximum emphasis on places of particular interest.

Figure 3:
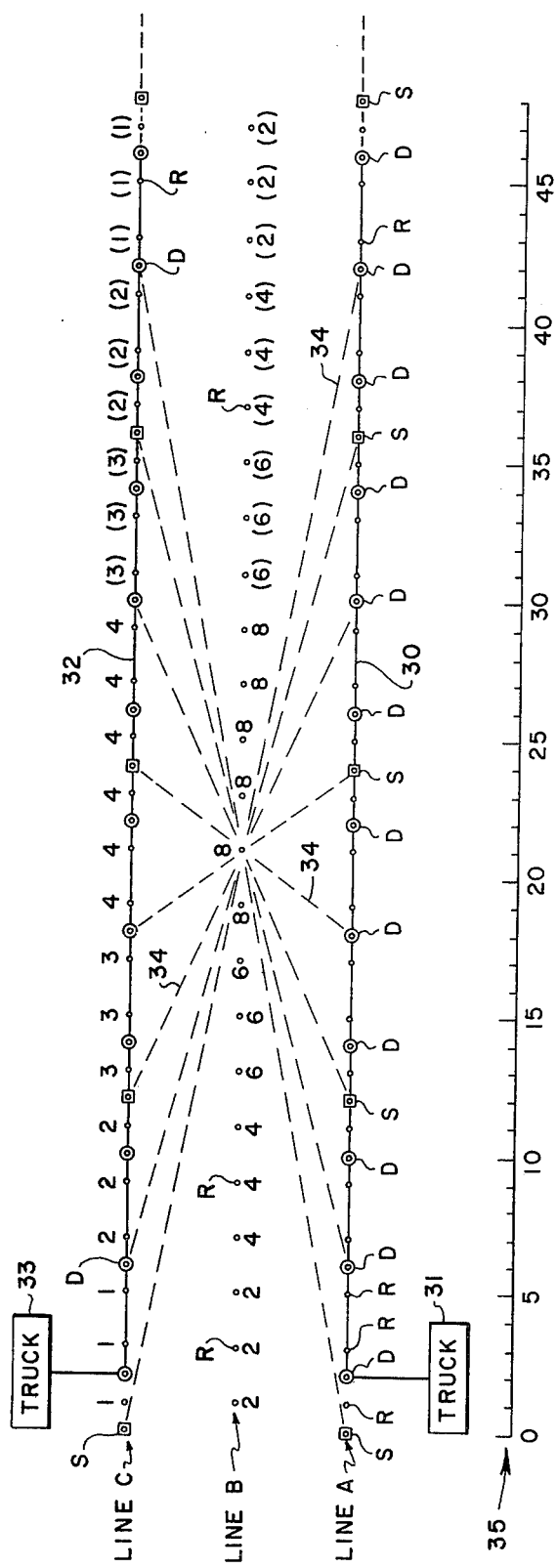
FIG. 3 is a plan view of a seismic source and detector layout in accordance with a lineal embodiment of the invention.

Referring to FIG. 3, there is shown a plan view of a seismic source and detector array as laid out on the surface of the earth in accordance with a lineal embodiment of the invention. The array of FIG. 3 includes a first set of spaced seismic detectors D located along a first line A and a second set of spaced seismic detectors D located along a second and different line C. Lines A and C are parallel and are spaced a substantial distance apart. The detectors D on line A are connected to a multi-conductor cable 30 which runs to a recording truck 31, while the detectors D on line C are connected to a multi-conductor cable 32 which runs to a second recording truck 33.

In practicing the method of FIG. 3, seismic disturbances are produced in a sequential manner along line A at spaced source points S located at points different from the locations of the detectors D. In a similar manner, seismic disturbances are also produced in a sequential manner along line C at spaced source points S located at points different from the locations of detectors D. Using the imaginary distance scale 35 running parallel to the detector lines for purposes of explanation, a typical procedure would be to produce a seismic disturbance at the source point (A, 0), where A denotes the detector line and the numeral denotes the distance value on the imaginary scale. The resulting subsurface reflections received by each of the various detectors D in both lines A and C are individually recorded. After this first seismic disturbance subsides, a second seismic disturbance is produced at source point (C, 0) and the subsurface reflections thereof received by all of the seismic detectors D in both lines A and C are again individually recorded. Following this, the three seismic detectors D located at (A, 2), (A, 6) and (A, 10) are picked up and relocated in a spaced in-line manner to the right of the right-hand end of the cable 30. Similarly, the three detectors D located at (C, 2), (C, 6) and (C, 10), together with their interconnecting lengths of cable, are picked up and transferred to the right of the right-hand end of cable 32. Following this, a seismic disturbance is produced at source point (A, 12) and the resulting subsurface reflections received by all of the various seismic detectors D are recorded. Thereafter, a seismic disturbance is produced at source point (C, 12) and the resulting seismic reflections received by all of the detectors D are again individually recorded. Following this, the three left-hand most detectors in each of lines A and C are picked up and transferred to similar spaced positions to the right of the right-hand ends of cables 30 and 32. Seismic disturbances are then produced at the next pair of source points, the resulting reflection recorded and the next three sets of detectors in each line are picked up and transferred to the right-hand ends of the lines. In this manner, the detector lines are extended in a continuous manner until the desired length of the earth's surface has been surveyed.

The foregoing method represents another application of the multi-directional technique of the present invention. More particularly, there is obtained with this method an additional line of reflection points R lying along a line B located intermediate the detector lines A and C. As is indicated by the ray paths 34 passing through the reflection point R located at (B, 21), each point along line B is sampled in a multi-directional manner from source detector pairs located on intersecting azimuths. Thus, in effect a solid cone of data is obtained regarding each such reflection point R along line B, (except, of course, for the few extreme left-hand points). Thus, not only does the present method yield a greater number of reflection points but, in addition, there can be obtained for the reflection points R along line B a greater degree of stacking than can be obtained along either of the single lines A and C. In particular, twice as many reflections are obtained for each of the reflection points along line B as are obtained for the corresponding ones of the reflection points along lines A and C.

The small numerals located adjacent the reflection points in lines B and C indicate the number of reflection or folds which can be stacked, it being noted that 8 different reflections can be stacked for the reflection point located at ($b$, 21), such reflections being represented by the different ray paths 34. The small numerals to the right of imaginary scale coordinate 30 are enclosed in parenthesis to show that they indicate the number of reflections obtained for the case where none of the detectors are picked up and moved from the left end to the right end of the array. Where the detectors are in fact picked up and moved in the manner previously described, there is obtained for each of the reflections points along lines A and C to the right of imaginary scale unit 30 a total of 4 reflection folds and for each of the reflection points along line B to the right of imaginary scale point 30 a total of 8 reflection folds, these totals remaining constant so long as the detectors continue to be picked up and transferred from left to right following each pair of seismic disturbances.

In accordance with a further feature of the present invention, both the areal method of FIG. 2 and the lineal method of FIG. 3 can be employed to provide a stacked shallow refraction survey. This is accomplished by reproducing in a coordinated manner the appropriately selected ones of the recorded refractions. The results of such refraction surveys can be used to further evaluate the reflection survey data.

Figure 4:
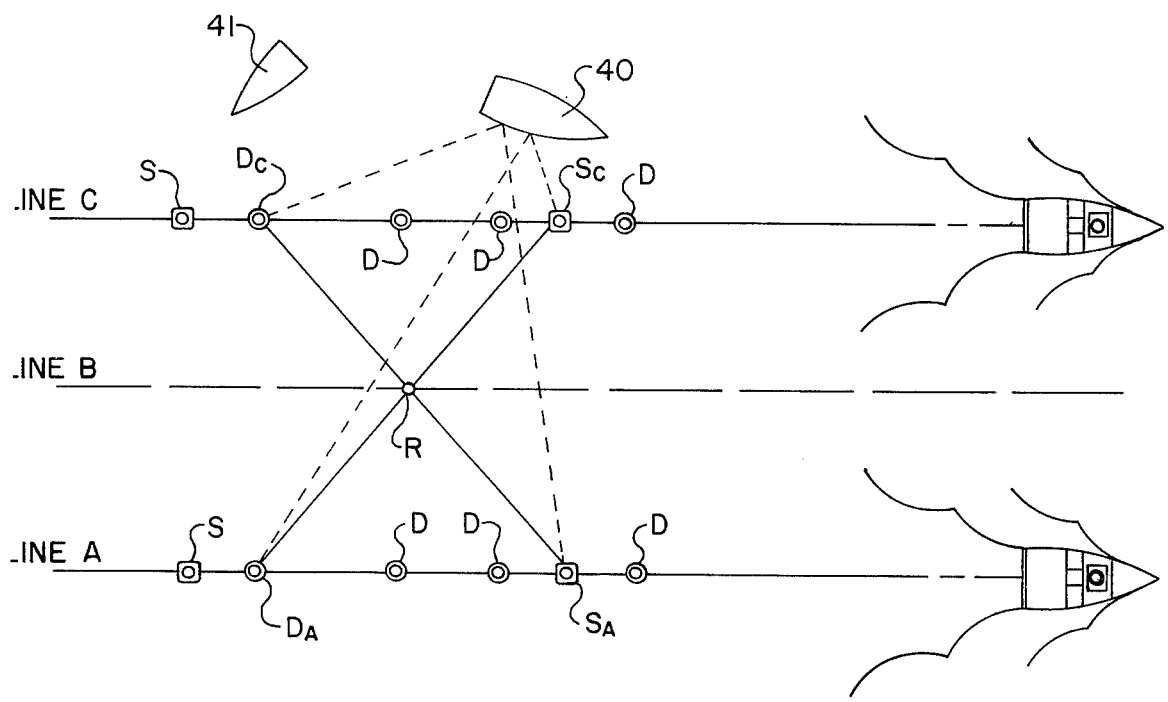
FIG. 4 is a diagrammatic plan view of a seismic source and detector layout similar that of FIG. 3, illustrating the methods of the invention employed to penetrate a diffraction barrier.

Attention is now directed to FIG. 4 which illustrates employment of the method of the invention to penetrate as seismic diffraction barrier. For the purposes of simplicity in discussion of this aspect of the invention, there is shown in simplified form in FIG. 4 a linear survey layout in accordance with the method of FIG. 3. Thus, the survey layout of FIG. 4 includes lines A and C, along with sources S and detectors D are spaced, and line B, which, although it contains no sources and detectors, does contain some of the reflecting points being surveyed, as explained above in connection with FIG. 3. For the purposes of this discussion, it is assumed that lines A, B and C are very long and that the source and detector spacings are the same as those employed in the embodiment of FIG. 3. Thus, in the portions of the lines A, B and C appearing in FIG. 4, four-fold sampling of each reflecting point along lines A and C will be effected, and eightfold sampling of each reflecting point along line B will be obtained from source detector pairs aligned on intersecting azimuths.

In FIG. 4, the survey is shown as being conducted in an offshore region where the water is navigable. Accordingly, on FIG. 4 two sunken ships 40 and 41 are shown as sources or generators of a diffraction barrier. There is a surprisingly high incidence or concentration of sunken vessels in the relatively shallow waters of bays, gulfs, seas and oceans which are areas of interest for seismic exploration. Objects other than sunken ships, such as 40 and 41, also are known to act as creators of diffraction barriers. These include outcrops on or near the sea floor, and small relatively hard structures in subsurface regions.

The manner in which sunken ships and other objects and features act as generators of a diffraction barrier is by action as seismic pseudo-sources. Because of their high reflectivity, they sharply reflect signals from planned seismic disturbances and such reflected signals are detected by the detectors and recorded as a manner of course, creating a confused record in which signals from significant reflecting points are completely masked, and, as a practical matter, obliterated in conventional seismic exploration techniques. Diffraction barriers can be created by objects in, in the neighborhood of, or above, a geologic region of interest. Thus, the sunken ships 40 and 41 shown in FIG. 4 illustrate such sources located outside of, but in the neighborhood of, the region of interest being surveyed.

The acoustical geometry of a diffraction barrier in its relation to the recorded signals it generates is extremely complex and difficult to analyze rigorously. But, for presnt purposes, the key geometrical fact is that a detector will receive for recording a signal from the pseudo-source creating the diffraction barrier at a time which is related to the sum of the distance between the detector and the pseudo-source, and the distance between the pseudo-source and the actual seismic source. In accordance with the present invention this fact is exploited, together with the multi-directional or multi-azimuth sampling of a single reflecting point and the technique of combining or stacking recordings from said reflecting point (preferably as many such recordings as conveniently possible), to effectively penetrate the diffraction barrier.

In FIG. 4, assume that a seismic disturbance has been created at the source point S on line C which is marked with a sub-script C. The detector D on line A marked with a sub-script A will receive a reflected signal from reflecting point R on line B. It will also receive a signal from sunken ship 40, whose arrival time at $D_A$ is a function of the distance $S_C$—40—$D_A$, this distance being indicated by dotted lines on FIG. 4. The signal received by the detector $D_A$ from pseudo-source 40 may completely mask the signal received from reflecting point R. Assume next that a seismic disturbance is created at the source point S on line A marked with the sub-script A. As a result of this disturbance detector $D_C$ on line C will detect a signal from reflecting point R. It will also receive a diffraction signal from pseudo-source 40, and the time of arrival of such signal at $D_C$ will be a function of the distance $S_A$—40—$D_C$, which distance is marked in FIG. 4 with lines. A consideration of FIG. 4 will reveal that the distances $S_A$—40—$D_C$ and $S_C$—40—$D_A$ are different and this means that when the recordings are stacked in accordance with the invention, the diffraction signals will not add totally, but rather will partially cancel, while the signals from reflecting point R will add in phase. The two-fold stacked composite signal will thus contain an amplified signal from reflecting point R and an attenuated diffraction signal. As the number of folds for a given reflection point which are stacked or combined is increased, the attenuation of the signals from diffraction source 40 is increased, and the strength of the signals from reflecting point R is enhanced by cumulative addition, so that a signal from reflecting point R becomes discernable notwithstanding the diffraction barrier.

Figure 5:
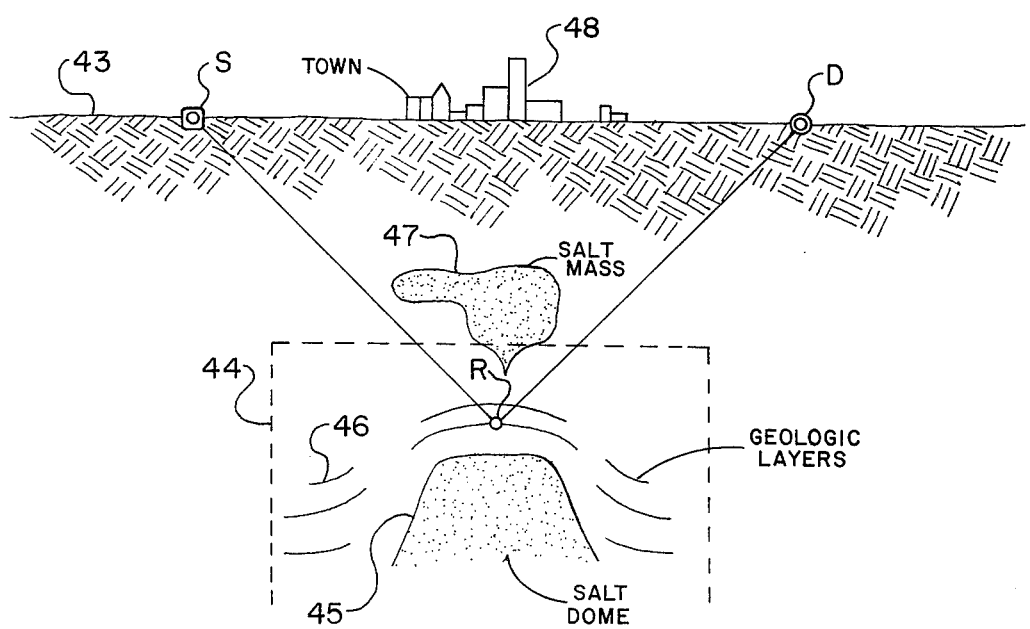
FIG. 5 is a diagrammatic vertical sectional view of a portion of the earth illustrating the methods of the invention employed to obtain data from a geologic region of interest beneath a signal blocking feature on or under the surface but above the region of interest.

FIG. 5 illustrates diagrammatically the application of the invention to the problem of seismically exploring a geologic region of interest so located with respect to a surface or subsurface feature above it that substantially no meaningful seismic data can be obtained by running a survey line across said feature and the region of interest. In FIG. 5 the surface of the earth is indicated at 43 and the geologic region of interest is indicated by the dotted outline 44. Within the region of interest 44 there is shown a salt dome 45, geologic layers 46 distorted by the salt dome (said distorted layers being of great interest in seismic exploration as indicators of possible oil bearing strata), and, at a level above the salt dome 45, a mass of salt 47 which may be considered a "bubble" of salt which has risen through overlaying geologic regions toward the surface from the dome. On the surface of the earth 43 there is shown a town 48.

Town 48 and salt mass 47 illustrate two features, one surface and geographic, and the other subsurface and geologic, which have, as a practical matter, made it substantially impossible to gather meaningful data from a geologic region of interest immediately below such a feature. In the case of town 48 it is impossible to do so for social regions; in the case of salt mass 47 the impossibility arises from physical reasons because mass 47 is substantially opaque to seismic signals. It should be understood that the diagram of FIG. 5, illustrates a situation which will occur relatively rarely, in that both a surface (social) barrier, and a sub-surface (physical) barrier, are positioned to block conventional exploration of the region of interest.

In accordance with the invention, a seismic source S is positioned to one side of and away from the blocking feature 47 or 48 and a detector D is placed on the opposite side of the blocking feature. Survey patterns such as those depicted in FIGS. 2 and 3, and FIG. 1 (if it is expanded to include a considerable number of source-detector pairs for a given reflecting point), may be used to provide multiple directional sampling of reflecting points of interest from a very "side-looking" angle of approach. The data so gathered and recorded in accordance with the invention is then combined or stacked from as many folds as produced good data concerning a given reflecting point to produce a composite signal which represents the reflecting point well, notwithstanding that the raw seismic signals were generated at longer than ordinary distances and greater than ordinary angles in order to avoid the blocking features 47 or 48.

It is to be understood that the specific numbers and spacings of sources and detectors shown in the foregoing embodiments are intended by way of example only. The number of sources and number of detectors, for example, can be increased or decreased for purposes of covering a larger or smaller surface area, for purposes of increasing or decreasing the reflection point density or the like. The matter of primary importance is to arrange the sources and detectors so that reflections in different directions are simultaneously recorded. As indicated previously, this enables the obtaining of a greater amount of data and better quality data concerning the subsurface earth structures for a given expenditure of time and labor.

While the foregoing methods have been described ith respect to their use on land, it is to be understood that such methods may also be used in water or water-covered areas such as oceans, bay, lakes, rivers, and the like.

While there have been described what are at present considered to be preferred embodiments of this invention, it will be obvious to those skilled in the art that various changes and modifications may be made therein without departing from the invention, and it is, therefore, intended to call all such changes and modifications as fall within the true spirit and scope of the invention.

What is claimed is;

1. A method for penetrating a seismic diffraction barrier created by objects in, in the neighborhood of, or above a geologic region of interest desired to be seismically explored comprising:

generating multiple pieces of data from a given reflecting point by means of disturbances created at source points and detectors located at detecting points such that at least some pairs, each pair comprising one source point and one detecting point, are aligned on azimuths which intersect at a vertical line passing through said reflecting point;

recording said multiple pieces of data, said data recordings containing diffraction signals masking a signal from said reflecting point in the geologic region of interest;

and combining data recordings containing data generated along a multiplicity of azimuths having a common intersection, whereby said diffraction signals in large part additively cancel one another and the signals from said reflecting point additively reinforce one another, to produce a composite recording containing a discernable signal representing said reflecting point.

2. A method for seismically exploring a geologic region of interest so located with respect to a surface or subsurface feature above it that substantially no meaningful seismic data can be obtained by running a survey line across said feature and the region of interest, said method comprising;

developing multiple pieces of data from a given reflecting point in said geologic region of interest from a multiplicity of pairs of seismic disturbance source points and detector points, ssaid pairs being aligned on azimuths which intersect at a vertical line passing through said reflecting point and said source points and detector points being located on the surface in areas away from said feature, the source point of any given pair being positioned on the opposite side of said feature from the detecting point of said pair;

recording the multiple pieces of data so developed; and stacking recordings of data from said reflecting point generated along intersecting azimuths.

* * * * *